United States Patent [19]

Tadauchi et al.

[11] 4,297,715
[45] Oct. 27, 1981

[54] ELECTROSTATIC RECORDING APPARATUS

[75] Inventors: Masaharu Tadauchi; Kunio Sato, both of Hitachi; Kiyohiko Tanno, Katsuta, all of Japan

[73] Assignee: Hitachi, Ltd., Tokyo, Japan

[21] Appl. No.: 54,273

[22] Filed: Jul. 2, 1979

[30] Foreign Application Priority Data

Jul. 14, 1978 [JP] Japan .................................. 53-85162

[51] Int. Cl.³ ........................ G11B 15/60; G01W 1/02
[52] U.S. Cl. ..................................... 346/150; 346/154
[58] Field of Search ............... 346/150, 153, 165, 154, 346/155

[56] References Cited

U.S. PATENT DOCUMENTS

| | | | |
|---|---|---|---|
| 2,919,191 | 12/1959 | Walkup | 346/165 |
| 3,023,070 | 2/1962 | Benn | 346/153 |
| 3,613,103 | 10/1971 | Harris | 346/165 |
| 3,662,396 | 5/1972 | Brown, Jr. | 346/153 |
| 3,798,657 | 3/1974 | Alden | 346/165 |
| 4,023,206 | 5/1977 | Nishibi | 360/75 |
| 4,087,825 | 5/1978 | Chen | 346/150 |

Primary Examiner—Vincent P. Canney
Attorney, Agent, or Firm—Craig and Antonelli

[57] ABSTRACT

Disclosed is an electrostatic recording apparatus comprising a wire electrode row including a multiplicity of wire electrodes which are continuously arranged substantially in a row and are divided into a plurality of wire electrode blocks each having the same number of wire electrodes, a plurality of auxiliary electrodes respectively arranged along the wire electrode row and in opposite to the plurality of wire electrode blocks, a driving circuit for selectively applying driving signals to the wire electrodes and the auxiliary electrodes in response to a recording signal, a humidity detector which detects ambient humidity to produce a signal representing a detected value, and means for controlling a waveform of the drive signal in accordance with the output signal from the humidity detector.

9 Claims, 13 Drawing Figures

ELECTROSTATIC RECORDING APPARATUS

The invention relates to an electrostatic recording apparatus and, more particularly, to an electrostatic recording apparatus for effecting the record of an image by applying a signal voltage between a plurality of wire electrodes and an auxliary electrode disposed in opposition to these wire electrodes.

An electrostatic recording apparatus using a multi-stylus head has recently been used in facsimiles, printers or the like. In brief, the electrostatic recording apparatus is provided with a number of wire electrodes and a plurality of auxiliary electrodes disposed in opposition to the wire electrodes. A recording paper is transferred close to both electrodes while at the same time signal voltages are selectively applied across both electrodes. In this way, an electrostatic latent image is recorded on the recording paper and the electrostatic latent image is developed by toner thereby to obtain a recorded image.

The electrostatic recording apparatus is generally categorized into two types of the apparatus: one with a one-side electrode type head in which a number of wire electrodes and a plurality of auxiliary electrodes are disposed on one side of a recording paper; the other with a both-side electrode type head in which a number of wire electrodes are disposed on one side of the recording paper while a plurality of auxiliary electrodes on the other side. A typical example of the electrostatic recording apparatus with the both side type electrode head is disclosed in U.S. application Ser. No. 28,694 entitled "Electrophotographic Recording System" filed on Apr. 15, 1970 by Arling Dix Brown Jr. and issued on May 9, 1972 as U.S. Pat. No. 3,662,396 and assigned to Clevite Corporation. The electrostatic recording system is comprised of a wire electrode row including a multiplicity of wire electrodes which are continuously arranged substantially in a row and are divided into a plurality of wire electrode blocks each having the same number of wire electrodes, first and second auxiliary electrode rows arranged along and on one and the other sides of the wire electrode row respectively and in opposition to the respective wire electrode blocks, and a drive circuit which responds to the recording signal to selectively drive the wire electrodes and the auxiliary electrodes. The drive circuit simultaneously drives the corresponding electrodes in each of the wire electrode blocks and successively drives an opposed pair of first and second auxiliary electrodes pair by pair. When the selected one pair of the first and second auxiliary electrodes and the wire electrode block facing the selected pair of auxiliary electrodes are driven, a voltage enough to make a record is produced between the wire electrode block and the auxiliary electrodes so that a portion of the recording paper close to those electrodes is charged and an electrostatic latent image is recorded thereon.

In general, an electrostatic image recorded in the electrostatic recording system depends largely on the characteristic of a recording paper, particularly the conductivity of the recording paper. Further, the conductivity of the recording paper depends on ambient humidity. Therefore, the quality of an electrostatic latent image is influenced by the ambient humidity. Particularly, when the humidity rises, a minimum voltage sufficient to record an electrostatic latent image, i.e. a recording initiating voltage, falls, with the result that an electrostatic latent image may blur or images may be formed on unnecessary portion on the recording paper. For example, in the electrostatic recording apparatus of the one-side electrode type, when a drive signal drives the selected pair of the auxiliary electrodes and the wire electrode block in opposition to the former, an electric field intensity between the corresponding wire electrodes in the adjacent wire electrode block and the selected auxiliary electrodes, reaches a value sufficient to record electrostatic latent image so that an unnecessary electrostatic latent image, i.e. a ghost image, is frequently formed, in addition to an electrostatic latent image formed on a desired portion of the recording paper. Following the completion of the first row electrostatic latent image recording, the second row electrostatic latent image is recorded. At this time the first row moves under the auxiliary electrode rows. For this, if a signal voltage is applied to the auxiliary electrodes, the electrostatic latent image recorded in the first row may be often erased by an electric field generated by the auxiliary electrodes.

Also, in the case of the electrostatic recording apparatus with the both-side electrode type head, when the ambient humidity rises, a ghost image often occurs.

Accordingly, an object of the invention is to eliminate the above-mentioned drawbacks of the conventional electrostatic recording apparatus.

Another object of the invention is to provide an electrostatic recording apparatus which may form a stable electrostatic latent image despite humidity changes.

According to the present invention, there is provided an electrostatic recording apparatus comprising a wire electrode row including a multiplicity of wire electrodes which are continuously arranged substantially in a row and are divided into a plurality of wire electrode blocks each having the same number of wire electrodes, a plurality of auxiliary electrodes arranged along the wire electrode row and respectively in opposition to the plurality of wire electrode blocks, a driving circuit for selectively applying driving signals to the wire electrodes and the auxiliary electrodes in response to a recording signal, the driving circuit simultaneously applying the driving signals to the corresponding wire electrodes of the respective wire electrode blocks, an electrostatic recording medium disposed close to the wire electrodes and the auxiliary electrodes, of which the portion close to both of the driven auxiliary electrode and the driven wire electrode opposite to the driven auxiliary electrode is charged thereby to have an electrostatic latent image thereon, means for relatively moving the wire electrodes, the auxiliary electrodes and the recording medium, a humidity detector for detecting ambient humidity thereby producing a signal representing a detected value, control means for controlling a waveform of at least one of a drive signal applied to the wire electrode and a drive signal applied to the auxiliary electrode, and means for developing the charged recording medium to obtain a visualized image.

Other objects and features of the invention will be apparent from the foregoing description taken in connection with the accompanying drawings, in which:

FIGS. 3(a) to 3(i) show a set of timing diagrams useful in explaining the recording operation of the electrostatic recording apparatus shown in FIG. 2;

FIGS. 7(a) to 7(h) show a set of timing diagrams useful in explaining the operation of the circuit shown in FIG. 6;

Throughout the drawings, like reference numerals will be used to designate like or equivalent parts or portions.

Figure 1:
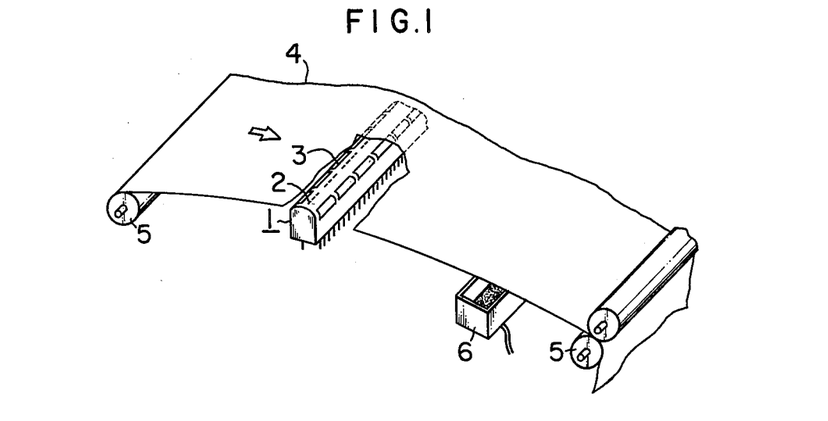
FIG. 1 shows an example of an electrostatic recording apparatus to which the invention is applied.

Reference is first made to FIG. 1 illustrating an electrostatic recording apparatus to which the invention is applied, with a one-side electrode type head 1. As shown, the recording head 1 is comprised of a number of wire electrodes 2 arranged substantially in a row and divided into a plurality of blocks each having the same number of wire electrodes, and first and second auxiliary electrode rows 3 disposed on both sides of the wire electrode row 1. The auxiliary electrodes of each of the first and second auxiliary electrode rows 3 are disposed corresponding in one-to-one relation to the wire electrode blocks, respectively. An electrostatic recording medium 4, for example, an electrostatic recording paper, is driven by a drive means 5 to move relative to the head 1 in a direction perpendicular to the wire electrode row 2. After an electrostatic latent image is recorded on the recording medium 4 moving close to and just above the head 1, the recording medium 4 enters a developing section, for example, a developing bath 6 thereby obtaining a visualized image.

Figure 2:
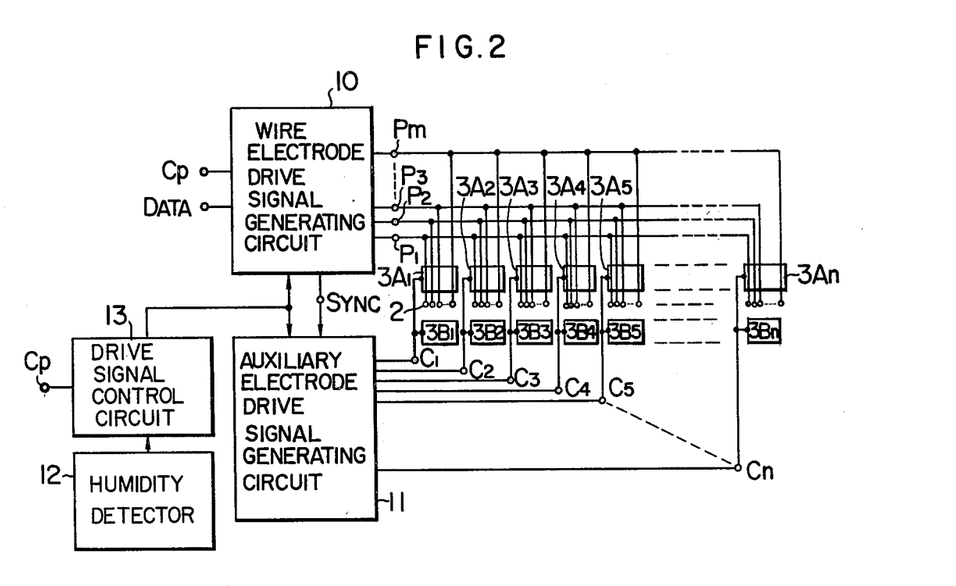
FIG. 2 shows a block diagram of an example of an electrostatic recording apparatus according to the invention.

Turning now to FIG. 2, there is shown a block diagram of an embodiment of an electrostatic recording apparatus with the one-side electrode type head shown in FIG. 1 according to the invention. The wire electrodes 2 has arranged substantially in a row and are divided into n blocks each having m wire electrodes. The auxiliary electrodes are also divided into an A-row electrode group including n auxiliary electrodes 3A1 to 3An and a B-row electrode group including n auxiliary electrodes 3B1 to 3Bn. The auxiliary electrodes 3A1 to 3An in the A-row electrode group are arranged along and on one side of the wire electrode row in such a way that the former respectively are in opposite to the wire electrode blocks in one to one relation. The auxiliary electrodes 3B1 to 3Bn are arranged along and on the other side of the wire electrode row in the same fashion as the A-row electrode group. Thus, the first to n-th blocks of the wire electrodes are respectively opposed to the auxiliary electrodes 3A1 to 3An and 3B1 to 3Bn.

The wire electrodes located in the corresponding positions in the respective wire electrode blocks are connected commonly to the corresponding drive signal terminals Pl to Pm of a wire electrode drive signal generating circuit 10, respectively. Pairs of the auxiliary electrodes of the A- and B-row auxiliary electrode groups, which are each disposed each other in opposite relation with each wire electrode block intervening therebetween, are connected commonly to the corresponding drive signal terminals Cl to Cn of an auxiliary electrode drive signal generating circuit 11, respectively. The wire electrode drive signal generating circuit 10 responds to a clock pulse coming in through a clock pulse input terminal Cp to successively distribute recording signals coming in through a data input terminal DATA to the drive portions therein corresponding to the drive signal terminals pl to pm, and delivers a synchronizing signal SYNC to the auxiliary electrode signal generating circuit 11 every time that the drive of the wire electrodes in each wire electrode block is effected. The auxiliary electrode drive signal generating circuit 11 responds to the synchronizing signals SYNC delivered from the circuit 10 to successively send out drive signals through the drive signal terminals Cl to Cn.

A humidity detector 12 detects an ambient humidity to provide a humidity signal representing the detected humidity to a drive signal control circuit 13 which in turn in response to the humidity signal controls the waveform of the drive signals supplied to the wire electrodes and the auxiliary electrodes.

The recording operation of the circuit mentioned above will be described with reference to FIGS. 3(a) to 3(i). In the figures, signal waveforms at the above described terminals are shown by the same reference symbols as the terminals. In the recording of the area of the recording medium 4 corresponding to the wire electrodes of the first block oposed to the auxiliary electrodes 3A1, 3B1, the first clock pulse Cp at time tl selects the drive signal terminal Pl and an input signal '0' applied to the DATA terminal at this time is held until the mth clock pulse at time $t_m$ arrives. The second clock pulse selects the terminal P2 and at this time the DATA terminal signal '1' also is held until the mth clock pulse arrives. Upon the arrival of the mth clock pulse which is the last pulse in the first block, at time $t_m$, the drive terminal Pm is selected and the information signal '1' at the DATA terminal at this time is applied to the drive portion corresponding to the drive signal terminal Pm. As a result, the drive signal '1' corresponding to the information signal '1' appears at the terminal Pm. Also at this time, the DATA terminal signals at times tl to $t_{m-l}$ which have been held are applied to the drive portions corresponding to the drive signal terminals Pl to $P_{m-l}$, the drive signals are applied to the corresponding terminals Pl to $P_{m-l}$, and the synchronizing signal SYNC is produced. The auxiliary electrode drive signal generating circuit 11 responds to the synchronizing signal SYNC to select the drive signal terminal Cl thereby to produce a drive signal (for example, a pulse signal with the pulse width of 30 μs and the amplitude of +300 V) at the terminal and then to drive the auxiliary electrodes 3A1 and 3B1 corresponding to the first block. Thus, the electrostatic recording is made by the wire electrode of those in the first block to which the drive signal '1' (a pulse signal with the pulse width of 30 μs and the amplitude of −300 V, for example) is applied. Now, the drive signal '0' corresponding to the recording signal '0' is 0 V. In the second block, the drive signal terminal C2 is driven and the auxiliary electrodes 3A2 and 3B2 are driven and so the electrostatic recording is performed in the second block.

Figure 3:
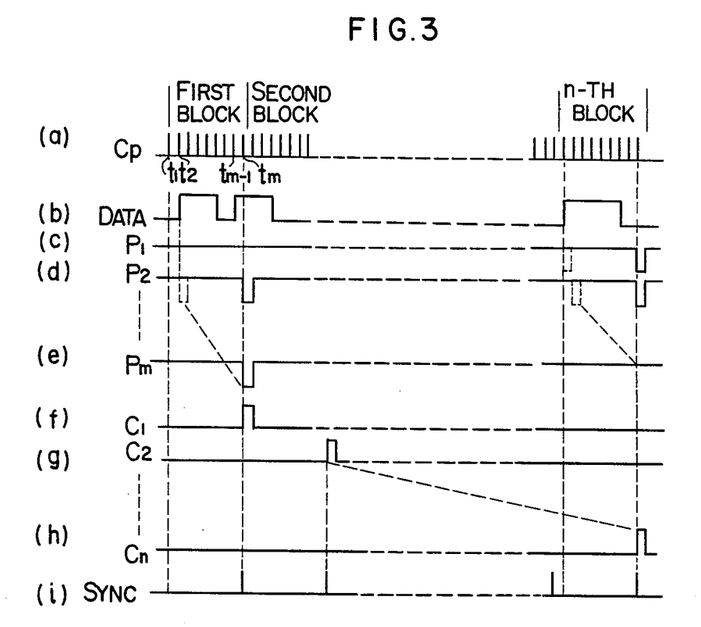

Following this, the auxiliary electrodes are sequentially driven and when the electrodes 3An and 3Bn are driven, the recording of one line is completed. In this manner, the respective lines are successively recorded.

The driving system mentioned above is a parallel drive system to apply the drive signals to the terminals P1 to Pm, i.e., to all of the wire electrodes at the same time in the recording of each block.

Alternately, a serial drive system may also be employed in which a drive signal terminal is selected every time a clock pulse is inputted, the recording signal at the DATA terminal at that time is applied to the drive signal terminal through the corresponding drive portion thereby drive the corresponding wire electrodes directly, while a the auxiliary electrode is continuously driven during the recording period of one block for recording. Thus, the drive signals are applied to the terminals P1 to Pm sequentially each time the clock pulse is received. The description to follow will proceed by showing the paralle drive system. Such serial drive system is shown, for example, in U.S. Pat. No. 3,979,760, and an example of the parallel drive system in "National Technical Report" vol. 20, No. 1, Feb. 1974, Japan.

The parallel drive system in the invention may employ that obtained by modifying the serial drive system of U.S. Pat. No. 3,979,760. Namely, the wire electrode drive signal generating circuit 10 of the invention may be constructed in such a manner that the wire electrode drive signal generating circuit of U.S. Pat. No. 3,979,760 further includes a shift register therein which stores recording signals distributed in response to clock pulses and delivers the stored recording signals to the drivers corresponding to the wire electrode drive signal terminals when it receives a last clock pulse of one block. By the way, when the drive signal '1' is applied to any one of the drive signal terminals P1 to Pm, the drive signal '1' is simultaneously applied to the corresponding wire electrode in each of the wire electrode blocks. Accordingly, when the recording of the first block is performed, if the drive signal '1' is applied to the drive signal terminal P1, the drive signal '1' is also applied to the corresponding wire electrode in the second wire electrode block in addition to the corresponding wire electrode in the first block. On the other hand, the auxiliary electrodes 3A1 and 3B1 are driven, so that an electric field necessary for the electrostatic recording is developed between the auxiliary electrodes A1 and B1 and the wire electrode in the first block, with the result that an electrostatic latent image is recorded on the portion of the recording medium in opposition to the wire electrode in the first electrode to which the drive signal '1' is applied.

In this case, when the ambient humidity rises, the conductivity of the recording medium rises so that the electric field between the auxiliary electrodes and the wire electrode which is necessary for the electrostatic recording on the recording medium decreases, if the width of the drive signal is fixed, and the minimum value of the absolute value of the drive signal voltage necessary for the electrostatic recording, i.e. the record starting voltage, decreases. In other words, the record starting voltage decreases as the humidity increases. On the other hand, when the ambient humidity rises, the minimum value of the pulse width of the drive signal necessary for recording an electrostatic latent image, i.e. the record starting voltage width, also reduces.

When the ambient humidity rises to a predetermined value, an electric field between the auxiliary electrodes and the wire electrode necessary for recording also decreases so that an electric field between the driven wire electrode in the second block adjacent to the first block and the auxiliary driven electrodes 3A1, 3B1 reaches a value necessary for the electrostatic latent image recording to record a portion of the recording medium opposite to the driven wire electrode in the second block. Such an undesired electrostatic latent image is called a ghost image and the minimum value of the absolute value of the drive signal voltage necessary for producing the ghost image is called a ghost starting voltage which decreases as the ambient humidity rises.

The ghost image also takes place when the pulse width of the drive signal is elongated beyond a pregiven value with a fixed drive voltage. The minimum value of the pulse width of the drive signal necessary for recording the ghost image when the voltage of the drive signal is fixed, is called a ghost starting voltage width. This narrows as the humitity rises.

When the first line recording is completed, and the recording operation enters the recording of the next second line, the first line recorded moves substantially just below the auxiliary electrode row. At this time if the ambient humidity is above a given value, when the auxiliary electrodes are sequentially driven, the voltage applied to the auxiliary electrodes erases the electrostatic latent image in the first line under the auxiliary electrodes. The minimum value of the drive voltage to the auxiliary electrode necessary for erasing the electrostatic latent image is called an erasing start voltage. The erasing start voltage decreases as the humidity rises. When the humidity is constant and the drive signal voltage to the auxiliary electrode is constant, if the width of the drive signal is widened longer than a given value, the electrostatic latent image is also erased. The minimum value of the drive signal width necessary for erasing the electrostatic latent image is called an erasing start voltage width. The erasing start voltage width decreases as the humidity rises.

Figure 4:
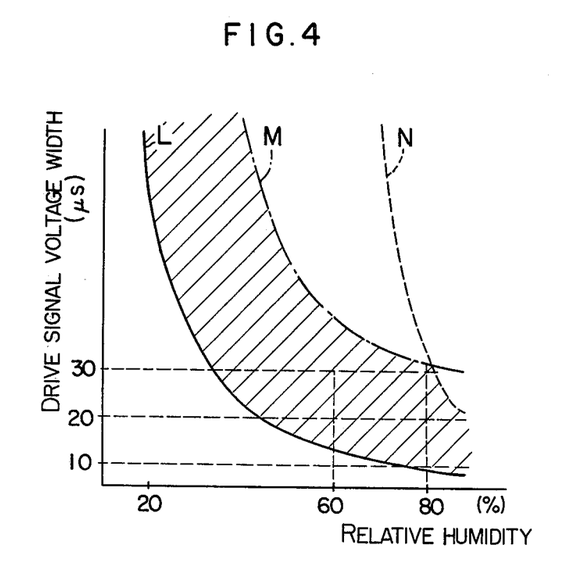
FIG. 4 shows a graph illustrating a relation of relative humidity to the voltage width of a drive signal.
Figure 5:
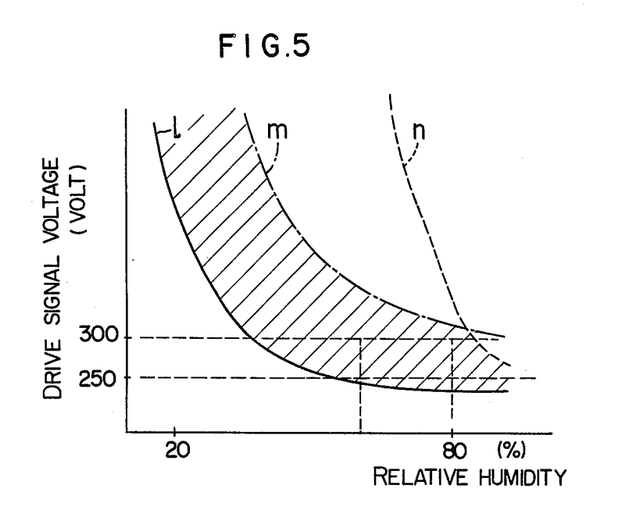
FIG. 5 shows a graph illustrating a relation of relative humidity to a voltage of a drive signal.

FIGS. 4 and 5 show relations of the relative humidity to the drive signal.

FIG. 4 shows an example of the relationship of the relative humidity in the atomosphere, the record starting voltage width, the ghost starting voltage width, and the erasing start voltage width when the voltage of the drive signal is fixed, for example $-300$ V for the drive signal voltage applied to the wire electrode and $+300$ V for the drive voltage to the auxiliary electrodes. In the graph, L, M, and N represent the record starting voltage width, the ghost starting voltage width and the erasing start voltage width respectively. The recording of an electrostatic image, the formation of a ghost image and the erasing of an electrostatic latent image take place in the area on the right side of the respective curves L, M and N. Accordingly, in order to record a preferable electrostatic latent image, the widths of the voltages applied to the wire electrode and the auxiliary electrodes must be confined within an area slanted in the figure. For example, when the relative humidity ranges from approximately 40% to 80%, the voltage widths of the drive signals applied to those electrodes are 30 $\mu$s. When it is above 80%, the voltage widths are 10 $\mu$s.

FIG. 5 shows an example of a relation amoung the ambient relative humidity, the record starting voltage, the ghost starting voltage and the erasing start voltage when the voltage widths of the drive signals applied to the auxiliary electrodes and the wire electrodes are fixed, for example, 30 $\mu$s. In the graph, curves l, m, and n represent the record starting voltage, the ghost starting voltage and the erasing start voltage. The recording of an electrostatic latent image, the formation of a ghost image and the erasing of an electrostatic latent image take place in an area on the right side of the curves l, m and n. Accordingly, in order to record a preferable electrostatic latent image, the voltage of the drive signals toward the wire electrodes and the auxiliary electrodes must be within an area slanted in the figure. For example, when the relative humidity ranges approximately 40 to 80%, the drive voltages to the wire electrodes and the auxiliary electrodes are −300 V and +300 V respectively. When it is above 80%, those are −250 V and +250 V respectively.

Figure 6:
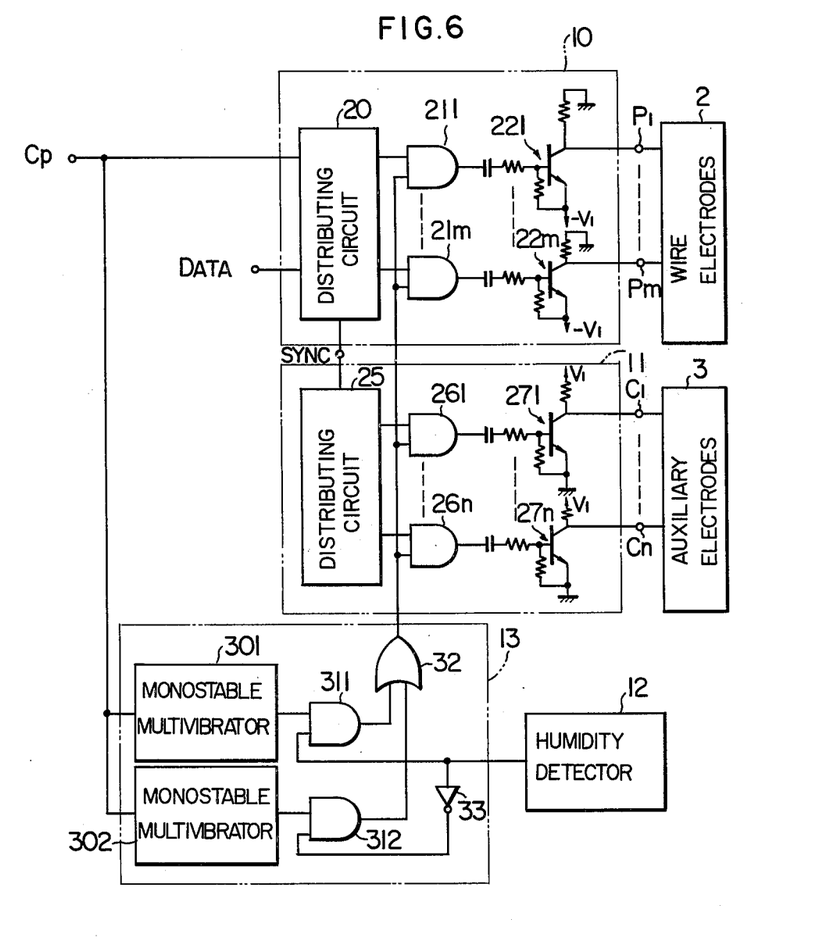
FIG. 6 shows a circuit diagram of a first embodiment of the electrostatic recording apparatus according to the invention.

Explanation to follow are embodiments of the invention so designed as to control the voltage widths of the drive signals to those electrodes on the basis of the characteristic shown in FIG. 4. FIG. 6 shows the first embodiment and FIGS. 7(a) to 7(h) are time charts for illustrating the operation of the embodiment. In FIGS. 7(a) to 7(h), the terminal characteristics are used to designate the corresponding wave forms, respectively. In this example, the drive signal voltage width is switched in two steps in accordance with the ambient relative humidity.

A drive signal control circuit 13 is comprised of a couple of monostable multivibrators 301 and 302 driven by a clock signal Cp, AND gates 311 and 312, an OR gate 32 and an inverter 33. The AND gates 311 and 312 are coupled at the first input terminals with the output terminals of the monostable multivibrators 301 and 302 respectively. The second input terminal of the AND gate 311 is directly connected to a humidity detector 12 and the second input terminal of the AND gate 312 is connected through the inverter 33 to the humidity detector 12. The AND gates 311 and 312 are connected to the input terminals of the OR gate 32. The output terminal of the OR gate 32 is connected to the first input terminals of AND gates 211 to 21m in the wire electrode drive signal control circuit 10 and AND gates 261 to 26n in the auxiliary electrode drive signal generating circuit 11.

The monostable multivibrator 301 produces a pulse having a time width W1, for example, 30 μs, as shown in FIG. 7(b) in response to a clock pulse, and the monstable 302 produces a pulse having a time width W2, for example 10 μs, as shown in FIG. 7(c) in response to a clock pulse. The humidity detector 21 produces a signal of logical '1' when the relative humidty H1 is below 80%, for example, and produces a signal of logical '0' when it is above 80%. Such a humidity detector is well known and marketed now such as a humidity adjustor manufactured by NIPPON RANCO Co. Ltd. Japan and sold with a trade name "HUMIDISTAT J 13 type".

Figure 7:
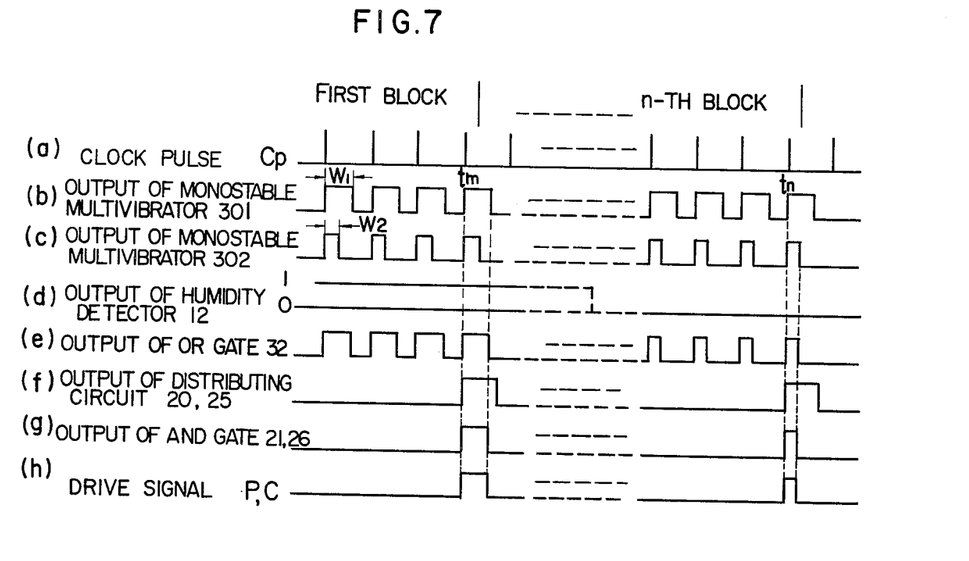

The wire electrode drive signal generator 10 is provided with a distributing circuit 20, AND gates 211 to 21m and drivers 221 to 22m. The AND gates 211 to 21m and the drivers 221 to 22m correspond to the drive signal terminals Pl to Pm, respectively. The distributing circuit 20 responds to the clock pulse Cp inputted through the clock pulse terminal Cp to distribute the recording signals coming in the DATA terminal successively to the corresponding AND gates 211 to 21m, but it holds those recording signals therein until all the information signals corresponding to one block have been inputted to the DATA terminal. As shown in FIG. 7, when the last clock pulse, i.e. the mth clock pulse, of the first block, for example, is inputted, the distributing circuit 20 applies a recording signal coming in through the DATA terminal to the AND gate 21m while at the same time applies the recording signals stored therein to the AND gates 221 to 21m-1. The pulse width of the output pulse from the distributing circuit 20 is narrower than the recurrence period of the clock pulse but wider than the pulse width W1 of the output pulse of the monostable multivibrator 301. The distributing circuit 20 produces a synchronizing signal to the SYNC terminal of the auxiliary electrode drive signal generating circuit 11 in synchronism with the last clock pulse, i.e. the mth clock pulse.

The distributing circuit 20 may be constructed in such a manner that it includes a hold means such as a m-bit shift register in addition to the wire electrode drive signal generating circuit in U.S. Pat. No. 3,979,760 which includes a counter for counting clock pulses, and a decoder for decoding the contents of the counter and for distributing incoming recording signals to wire electrode drive circuits in accordance with the decoded value. The shift register may be preferably disposed between the decoder and the drive circuits and stores therein the recording signals until the last clock pulse (i.e. m-th clock pulse) is applied, and then it supplies all of the recording signals in one block to the drive circuits simultaneously when the counted value of the counter becomes m.

The drive portions 221 to 22m respectively include transistors which are connected at the base to the outputs of the corresponding ANd gates 211 to 21m, at the collectors to the corresponding drive signal terminals Pl to Pm, and at the emitters to a DC power source −V1 (−300 V, for example).

The auxiliary electrode drive signal generating circuit 11 is comrised of a distributing circuit 25, n AND gates 261 to 26n and n drive portions 271 to 27n. The AND gates 261 to 26n and the drive portions 271 to 27n correspond to the drive signal terminals Cl to Cn, respectively. In response to the synchronizing signals applied from the distributing circuit 20, the distributing circuit 25 sequentially applies pulse signals of logical '1' to the AND gates 261 to 26n, thereby to enable these ANd gates. The pulse width of the output signal is narrower than the reccurrence period of the clock pulse but is wider than that W1 of the output pulse signal derived from the monostable multivibrator 301. The drive portions 271 to 27n respectively include transistors which are connected at the bases to the outputs of the corresponding AND gates 261 to 26n, at the collectors to the corresponding drive signal terminals Cl to Cn, and the emitters commonly to a Dc power source V1 (300 V, for example).

The auxiliary electrode drive signal generating circuit 25 may be constructed in such a manner that it includes a counter for counting synchronizing pulses applied from the circuit 20 and a decoder for decoding the contents of the counter. The outputs of the decoder are connected to the AND gates 261 to 26n thereby applying pulse signals of logical '1' to the AND gates 261 to 26n sequentially in synchronism with the synchronizing pulses.

With such a construction, when the ambient humidity is lower than a given value of 80%, the humidity detector 12 produces logical '1' so that the output of the monostable multivibrator 301 is applied through the AND gate 311 and the OR gate 32 to the other input terminals of the AND gates 211 to 21m and 261 to 26n of the drive signal generating circuits 10 and 11. Accordingly, in the drive signal generating circuit 10, in response to the last clock pulse of one block, for example, in response to a clock pulse at time $t_m$, as shown in FIG. 7, the distributing circuit 20 distributes the recording signals to the AND gates 211 to 21m. Upon receipt of the recording signal '1', the AND gate permits a pulse coming from the OR gate 32 to pass therethrough to the corresponding drive portion. As a result, drive signal with the pulse width W1 (e.g. 30 μs) and the amplitude of $-V$ ($-300$ V) is applied to the corresponding drive signal terminal.

In the drive signal generating circuit 11, at time $t_m$, the AND gate 261 corresponding to the first block permits a pulse delivered from the OR gate 32 to pass therethrough to drive the drive portion 271 so that a signal with the width W1 (30 μs) and the amplitude of V1 (e.g. 300 V) are applied to the corresponding drive signal terminal Cl. In this manner, an electrostatic latent image is formed on the portion of recording medium in opposition to the driven wire electrodes of the first block.

When the relative humidity reaches 80% or more, the output signal of the humidity detector 12 becomes logical '0' so that the output signal of the monostable multivibrator 302 is applied to the drive signal generating circuits 10 and 11, through the AND gate 312 and the OR gate 32. Accordingly, when the recording is made in the nth block, for example, the AND gates 211 to 21m having received the recording signals '1' permit pulses coming from the OR gate 32 to pass therethrough to the corresponding drive portions 221 to 22m at the time point of generation of the last clock pulse of the nth block so that signals with the width E2 (for example, 10 μs) and the amplitude of 300 V to the corresponding drive signal terminals Pl to Pm. Similarly, at time $t_n$ the AND gate 26n corresponding to the nth permits a pulse from the OR gate 32 to pass therethrough to drive the drive portion 27n so that a voltage signal with the width W2 and of the amplitude V1 is applied to the corresponding drive signal terminal $C_n$. In this manner, an electrostatic latent image is formed on the portion of the recording medium in opposition to the wire electrodes of the nth block. Accordingly, the ghost image is prevented from being produced and an electrostatic latent image recorded is prevented from being erased.

Figure 8:
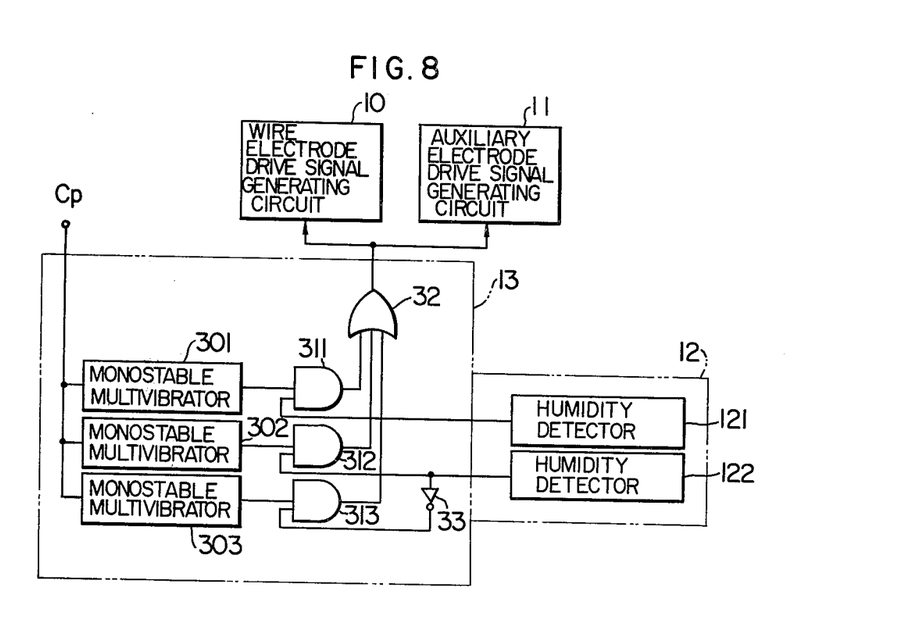
FIGS. 8 to 11 show circuit diagrams of second to fifth embodiment of electrostatic recording apparatus according to the invention.

FIG. 8 shows a second embodiment of the electrostatic recording apparatus according to the invention in which the pulse width of the drive signals are switched by three steps in accordance with the humidity. In this embodiment, the drive signal control circuit 13 is comprised of three monostable multivibrators 301 to 303 which respond to the clock pulse Cp to apply pulses with pulse widths W1 to W3 to AND gates 311 to 313 respectively. In this case, the pulse widths W1 to W3 are: W1 = 30 μs, W2 = 20 μs and W3 = 10 μs. The humidity detector unit 12 includes humidity detectors 121 and 122. The humidity detector 121 produces an output signal '2' when the relative humidity is below H1, for example 60%, and produces a signal of '0' when it is above H1. The humidity detector 122 produces an output signal '1' when the relative humidity is below H2, for example, 80%, and produces a signal '0' when it is above H2. The humidity detector 121 has an output directly coupled with the input of the AND gate 311. The output of the humidity detector 122 is directly coupled with the input of the AND gate 312 and with the input of the AND gate 313 through a NOT gate 33. The output signals from the AND gates 311 to 313 are applied through an OR gate 32 to the drive signal generating circuits 10 and 11 which have the same constructions as those shown in FIG. 6. In this embodiment, when the humidity is below H1, i.e. 60%, the outputs of the detectors 121 and 122 become '1', and so the output pulses of the monostable multivibrator 301 and 302 are applied through the AND gates 311 and 312 and the OR gate 32 respectively. Therefore, the pulse width of the drive signal applied to the wire electrode and the auxilliary electrode is W1 (30 μs). When the relative humidity is between 60% to 80%, only the output of the detector 122 is logical '1'. As a result, the output of the monostable multivibrator 302 is sent out through AND gate 312 and the OR gate 32, so that the width of the drive signal is W2 (20 μs). When the relative humidity is above 80%, the output of the monostable multivibrator 303 is applied through the AND gate 313 and the OR gate 32, so that the width of the drive signal is W3 (10 μs).

The output of the humidity detector 121 may be applied to the AND gate 312 through a NOT gate (not shown).

Figure 9:
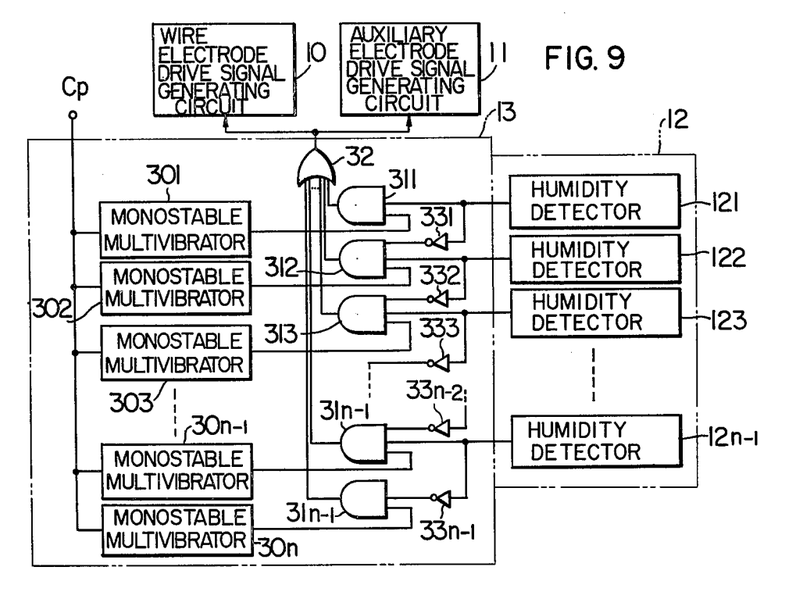

FIG. 9 shows a third embodiment of the electrostatic recording apparatus according to the invention, in which the widths of the drive signals are changed by n steps in accordance with ambient humidity. The drive signal control circuit 13 in this example has n monostable multivibratos 301 to 30n which respond to the clock pulse Cp to produce pulses with the pulse widths W1 to Wn (W1 > W2 > W3 ... > Wn) for application to the corresponding AND gates 311 to 31n respectively. The humidity detector unit 12 has humidity detectors 121 to 12n which produces output signals each of logical '1' when the relative humidity is below H1, H2, ... Hn (H1 < H2 < H3 ... < Hn) and produce output signals of '0' when it is above respective ones respectively. The outputs of the humidity detectors 121 to 12n−1 are inputted to the AND gates 311 to 31n−1, respectively, and the outputs of the humidity detectors 121 to 12n−1 respectively are applied to the AND gates 312 to 31n, preferably through NOT gates 331 to 33n−1. The outputs of the AND gates 311 to 31n are applied through the OR gate 32 to the drive signal generating circuits 10 and 11 which have the same constructions as those shown in FIG. 6. When the humidity is below H1, all of the humidity detectors 121, 123, ... 12n−1 become '1' but due to the operation of the NOT gates 331 to 33n−1, only the AND gate 311 is enabled. Thus, the output pulse of the monostable multivibrator 301 is applied to the drive signal generating circuits 10 and 11 through the AND gate 311 and the OR gate 32, so that a drive signals with the width W1 are applied to the wire electrodes and the auxiliary electrodes. When the humidity is between H1 to H2 %, only the AND gate 312 is enabled. Thus, the output of the monostable multivibrator 302 is sent out through the AND gate 312 and so the width of the drive signal is set to be W2. Similarly, when the humidity is above Hn, only the AND gate 31n is enabled and the output of the monostable vibrator 30n is outputted through the AND gate 31n and so the voltage width of the drive signal becomes Wn. The electrostatic recording apparatus thus constructed eliminates the formation of a ghost image and the erasing of an electrostatic image and provides a recorded image of which the density is independent of a variation of humidity.

The first to third embodiments control the voltage width of drive signals applied to the wire electrodes and the auxiliary electrodes. As an alternative, however, the voltage width of the drive signal applied to the wire electrode may be fixed while only that to the auxiliary electrode may be variably controlled. Namely, the pulse width of the output recording signal of the distributing circuit 20 may be fixed at a constant value (i.e. 30 μs) and the recording signal with the pulse width 30 μs may be applied to the drive portion.

An explanation to follow is an elaboration of embodiments of an electrostatic recording apparatus according to the invention which control the voltage of the drive signal applied to the wire electrodes and the auxiliary electrodes on the basis of the characteristic shown in FIG. 5.

Figure 10:
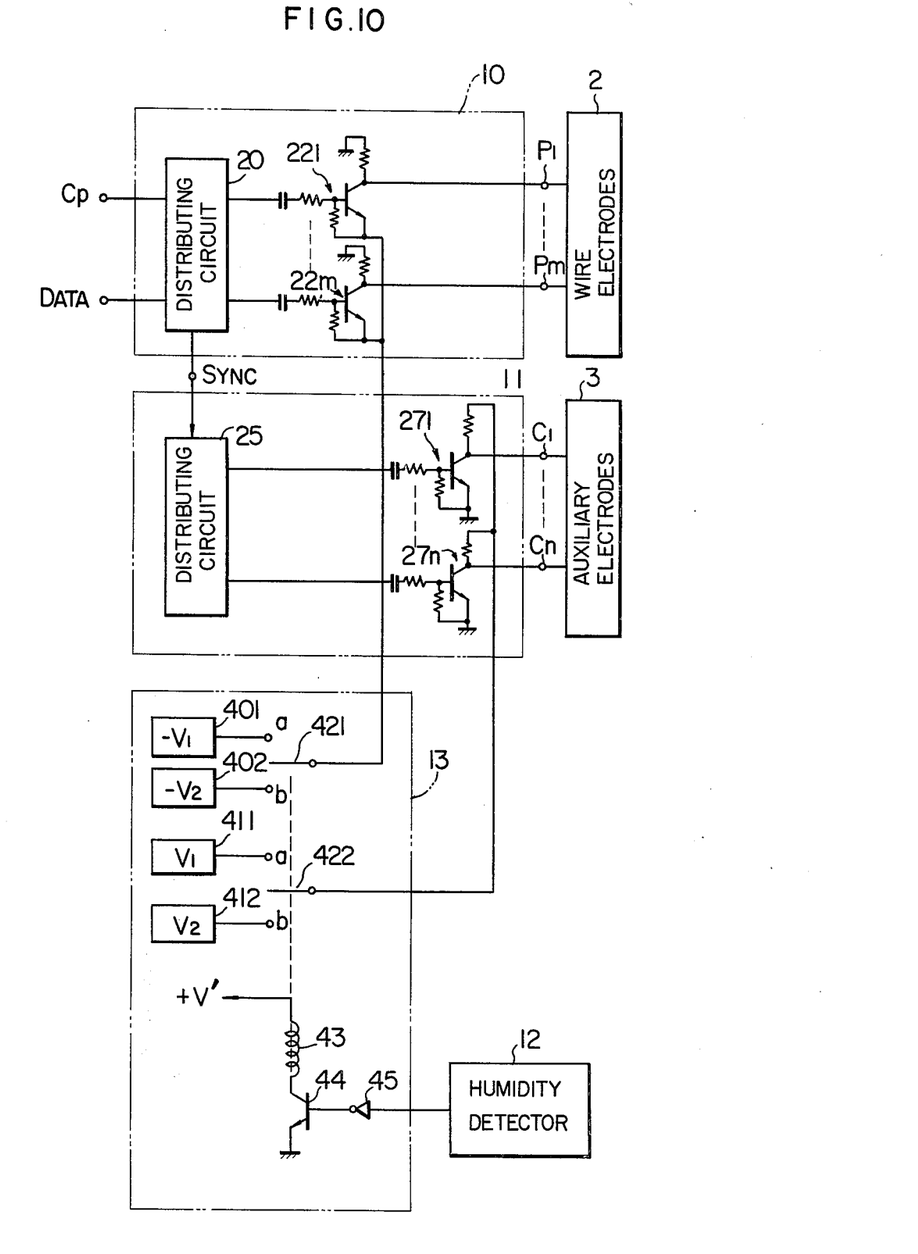

FIG. 10 shows a fourth embodiment according to the invention in which the voltage of the drive signal is switch by two steps in accordance with the ambient temperature. The wire electrode drive signal generating circuit 10 includes a distributing circuit 20 and drive portions 221 and 22m corresponding to drive signal terminals Pl to Pm. The distributing circuit 20 responds to the clock pulse Cp to sequentially distribute recording signals arriving at the DATA terminal to the drive portions 221 to 22m. The recording signals are held in the distributing circuit 20 until all the recording signals of one block arrive at the DATA terminal. As all the recording signals of one block have arrived thereat in response to the last clock pulse of one block, all the recording signals are applied to the corresponding drive portions 221 to 22m. The pulse width of each recording signal applied to the drive portion is fixed and 30 μs, for example. The adjustment of the pulse width of the recording signal may be effected by providing a monostable multivibrator between a shift register in the circuit 20 and the drive portion. The synchronizing signal SYNC is applied to the distributing circuit 25. The auxiliary electrode drive signal generating circuit 11 has a distributing circuit 25 and n drive portions 271 to 27n corresponding to the drive signal terminals Cl to Cn. In response to the synchronizing signal SYNC, the distributing circuit 25 sequentially distributes a pulse signal '1' of a fixed pulse width (e.g. 30 μs) to the drive portions 271 to 27n. The pulse width of the recording signal applied to the drive portion may be adjusted by a monostable multivibrator. The drive signal control circuit 13 is comprised of DC power sources 401, 402, 411, and 412 for respectively supplying −V1, −V2, V1 and V2, single-pole and double-throw reed switches 421 and 422, a coil 43, a transistor 44, and a NOT gate 45. The DC power sources 401 and 402 are connected to the drive portions 221 to 22m of the drive signal generating circuit 10, through the reed switch 421. The DC power sources 411 and 412 are connected to the drive portions 271 to 27n of the drive signal generating circuit 11, through the reed switch 422. The transistor 44 is connected at the collector to the DC power source +V (not shown) through a coil 43, at the base to the humidity detector 12 through the NOT gate 44, and at the emitter to ground.

The humidity detector 12 produces a signal of '1' when the humidity is below H1 (for example, 80%), and produces a signal '0' when it is above H1. In operation, when the ambient humidity is above H1, the humidity detector 12 produces a signal '1' which in turn passes through the inverter 44 to reach the base of the transistor 44. Accordingly, the transistor 44 is in off state so that the relay coil 43 is not energized. For this, the movable terminals of the switches 421 and 422 are both positioned at the contacts a so that the DC power source 401 supplies −V1 (for example, −300 V) to the drive portions 221 to 22m and the DC power source 411 supplied V1 (for example, 300 V) to the drive portions 271 to 27n.

Accordingly, in the wire electrode drive signal generating circuit 10, the distributing circuit 20 applies recording signals to the bases of the transistors in the drive portions 221 to 22n so that the transistors in the drive portions receiving the drive signal '1' are conductive to permit the voltage −V1 to the corresponding drive signal terminals Pl to Pm during a period of 30 μs. In the auxiliary electrode drive signal generating circuit 11, the distributing circuit 25 sequentially distributes a signal '1' to the drive portions 271 to 27n every time it receives the synchronizing signal SYNC. Accordingly, the transistors in the drive portions 271 to 27n are conductive every application of the synchronizing signal SYNC so that the voltage V1 (300 V) is sequentially applied to the corresponding drive signal terminals Cl to Cn during 30 μs. Therefore, −300 V is applied to the wire electrode and 300 V is applied to the auxiliary electrode so that an electrostatic latent image is recorded.

When the relative humidity is above 80%, the humidity detector 12 becomes '0' to render the transistor 44 conductive to energize the relay 43. As a result, the movable contacts of the switches 421 and 422 are turned to the contacts b, respectively, so that −V2 (for example, −250 V) is applied to the drive portions 221 to 22m, and V2 (for example, 250 V) is applied to the drive portions 271 to 27m. Thus, −250 V is applied to the wire electrode and 250 V to the auxiliary electrode and so there is no production of a ghost image and no erasure of an electrostatic latent image.

Figure 11:
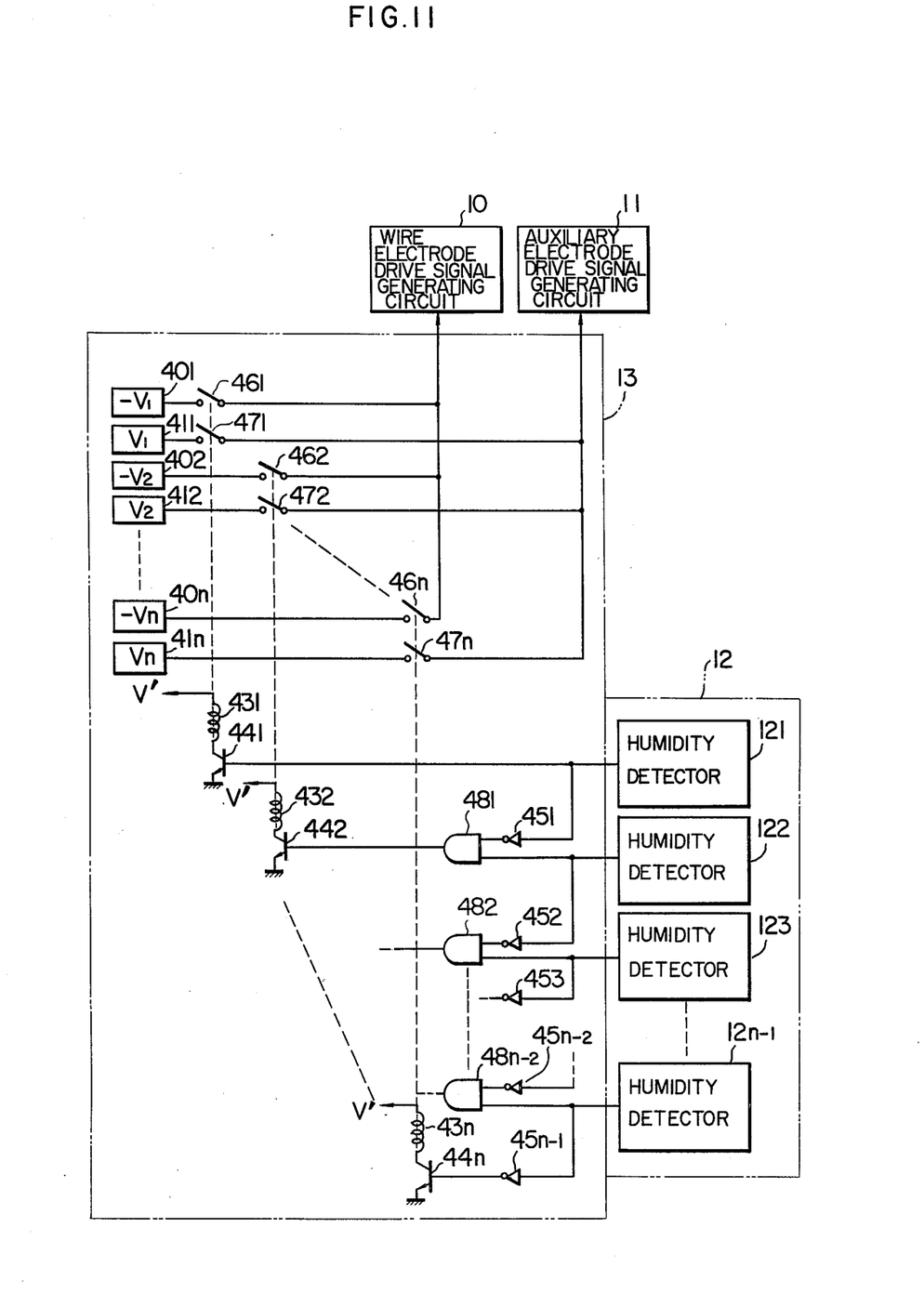

Turning now to FIG. 11, there is shown a fifth embodiment of the electrostatic latent image recording apparatus according to the invention. This embodiment switches by n steps the voltage of the drive signal in accordance with ambient humidity. In the figure, the drive signal control circuit 13 is comprises of n DC power sources 401 to 40n for supplying voltages −V1, −V2, ... −Vn (V1 > V2 > ... > Vn), n DC power sources 411 to 41n for supplying voltages V1, V2, ... Vn, reed switches 461 to 46n, 471 to 47n, relay coils 431 to 43n, transistors 441 to 44n, AND gates 481 to 48n−2, and inverters 451 to 45n−1. The DC power sources 401 to 40n are coupled with the drive signal generating circuit 10, through the reed switches 461 to 46n respectively. The DC power sources 411 to 41n are coupled with the signal generating circuit 11, through the reed switches 471 to 47n respectively. The drive signal generating circuits 10 and 11 are the same in construction as those in FIG. 10. When the relay coils 431 to 43n are energized,those close the corresponding reed switches 461, 471;...; 46n, 47n. The humidity detector unit 12 includes humidity detectors 121 to 12n-1. The humidity detectors 121 to 12n−1. produce signals of '1' when the relative humidity is below H1, H2, ... Hn−1 (H1 > H2 ... > Hn−1), and produces signals '0' when it is above H1, H2 ... Hn−1 respectively. The output of the humidity detector 121 is directly connected to the base of the transistor 441; the outputs of the unit humidity detectors 122, 123 to 12n−1 to the bases of the transistors 442, 443, ... 44n−1, through the AND gates 481, 482, ... 48n−2; the outputs of the unit humidity detectors 121, 122, 123, ... 12n−2 to the AND gates 481, 482, ... 48n−2, through the inverters 451, 452, 453, ...

$45n-2$, respectively; the output of the humidity detector $12n-1$ to the base of the transistor $44n$, through the inverter $45n-1$.

With such a construction, when the humidity is above H1, the outputs of the humidity detectors 121 to $12n-1$ are logical '1' so that only the transistor 441 is turned on to energize the relay coil 431 to close the corresponding reed switches 461 and 471. Accordingly, voltage $-V1$ and V1 are applied to the drive signal generating circuits 10 and 11, respectively.

When the relative humidity is between H1 and H2, only the output of the humidity detector 121 is '0' and the outputs of the humidity detectors 122 to $12n-1$ are logical '1' to turn on only the transistor 442. Accordingly, the relay coil 432 is energized to close only the reed switches 462 and 472 so that the voltage $-V2$ and V2 are applied to the drive signal generating circuits 10 and 11, respectively.

Similarly, when the humidity is more than $Hn-1$, the relay coil $43n$ is energized to close the reed switches $46n$ and $47n$ so that voltages $-Vn$ and Vn are applied to the drive signal generating circuits 10 and 11, respectively. In this manner, the formation of a ghost image and the erasure of an electrostatic latent image are prevented. Further the density of a recorded image is invariable independently of a humidity variation.

The fourth and fifth embodiments each control the voltage of the drive signal applied to the wire electrode and the auxiliarly electrode. In an alternation, the voltage of the drive signal to the wire electrode may be fixed at $-300$ V, for example, only the voltage of the drive signal to the auxiliary electrode may be controlled. For example, the voltage of the drive signal to the auxiliary electrode may be set at 300 V when the humidity is below 80%, and 200 V when it is above 80%. In this case, the output of the distributing circuit 20 is directly applied to the drive portions 221 to $22m$, not via the AND gates 211 to $21m$.

Figure 12:
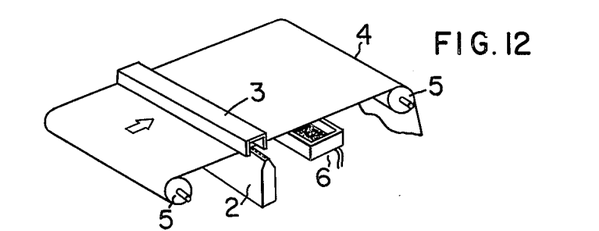
FIG. 12 shows another example of an electrostatic recording apparatus to which the invention is applied.
Figure 13:
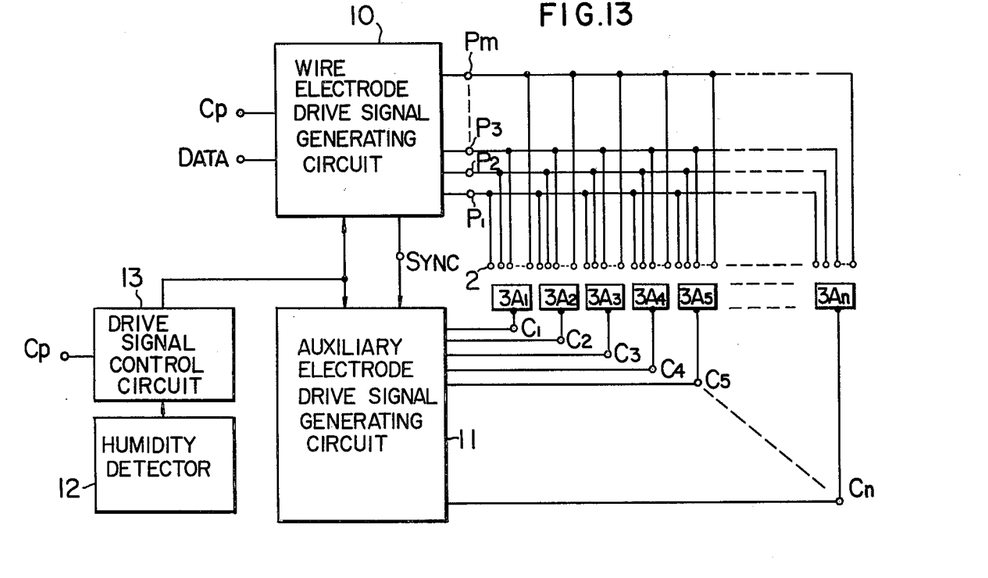
FIG. 13 shows a block diagram of another example of the electrostatic recording apparatus according to the invention.

Although the above-mentioned embodiments use a one-side electrode type head, a both-side electrode type head may also be used in the electrostatic recording apparatus according to the invention. FIG. 12 shown an example of the electrostatic recording apparatus using the both-side electrode head to which the invention is applied. In the figure, a wire electrode row 2 is disposed on one side of the recording paper 4 and auxiliary electrodes 3 are disposed on the other side of a recording paper in opposition to the wire electrode. FIG. 13 shows a block diagram of an embodiment of an electrostatic recording apparatus using the both-side electrode head according to the invention. In the embodiment, the constructions of the blocks 10, 11, 12 and 13 are the same as those 10, 11, 12 and 13 shown in FIG. 2. The wire electrode row 2 is divided into m blocks each including m wire electrode elements. The auxiliarly electrodes 3 are comprised of n auxiliary electrodes 3A1 to 3An disposed confronting the wire electrode blocks. In the case of the electrostatic recording system with the both-side electrode type head is likely to form a ghost image when ambient humidity rises. However, it is free from the erasure problem of an electrostatic latent image. In order to make an electrostatic record with a fixed density of a recording image irrespective of a humidity variation, the voltage width of the drive signal controlled into an area defined between the curves L and M in FIG. 4 or the voltage of the drive signal is controlled to be confined within the area defined between the curves l and m shown in FIG. 5.

Accordingly, the same construction as one shown in FIGS. 8, 9, 10 or 11 may be used to control the voltage width or the voltage of the drive signal into the area in accordance with a change of the relative humidity.

The embodiments mentioned above are each of a parallel drive system for recording an electrostatic latent image from each wire electrode block. A serial drive system may also be used for the electrostatic recording apparatus according to the invention. In the serial drive system, the recording signal arriving at the DATA terminal are sequentially distributed into the drive signal terminals Pl to Pm in synchronism with the clock pulse for effecting the record of an electrostatic latent image.

We claim:

1. An electrostatic recording apparatus comprising:
a wire electrode row including a multiplicity of wire electrodes which are continuously arranged substantially in a row and are divided into a plurality of wire electrode blocks each having the same number of wire electrodes;
a plurality of auxiliary electrodes arranged along said wire electrode row and respectively in opposition to said plurality of wire electrode blocks;
a driving circuit for selectively applying driving signals to said wire electrodes and said auxiliary electrodes in response to a recording signal, said driving circuit simultaneously applying said driving signals to the corresponding wire electrodes of the respective wire electrode blocks;
an electrostatic recording medium disposed close to said wire electrodes and aid auxiliary electrodes, of which the portion close to both of the driven auxiliary electrode and the driven wire electrode opposite to the driven auxiliary electrode is charged thereby to have an electrostatic latent image thereon;
means for relatively moving said wire electrodes, said auxiliary electrodes and said recording medium;
a humidity detector for detecting ambient humidity thereby producing a signal representing a detected value;
control means for controlling a waveform of at least one of a drive signal applied to said wire electrode and a drive signal applied to said auxiliary electrode in accordance with the output signal from said humidity detector; and
means for developing said charged recording medium to obtain a visualized image without formation of a ghost image.

2. An electrostatic recording apparatus according to claim 1, wherein said drive signal control means controls the pulse width of said drive signal in accordance with the output signal from said humidity detector.

3. An electrostatic recording apparatus according to claim 1, wherein said drive signal control means controls an absolute value of said drive signal in accordance with the output signal from said humidity detector.

4. An electrostatic recording apparatus according to claim 1, wherein said wire electrodes are disposed on one side of said recording medium and said auxiliary electrodes disposed on the other side of said recording medium, and wherein, when said driving circuit drives said selected auxiliary electrode and said wire electrode opposite to said selected auxiliary electrode, discharge is performed between said selected auxiliary electrode and said corresponding wire electrodes with intervention of said electrostatic recording medium therebetween thereby recording an electrostatic latent image thereon.

5. An electrostatic recording apparatus according to claim 4, wherein said drive signal control means controls the pulse width of at least one of said drive signal applied to said selected auxiliary electrode and said corresponding electrodes, in accordance with the output signal of said humidity detector.

6. An electrostatic recording apparatus according to claim 4, wherein said drive signal control means controls the amplitude of at least one of said drive signal applied to said selected auxiliary electrode and said corresponding wire electrodes, in accordance with the output signal of said humidity detector.

7. An electrostatic recording apparatus according to claim 1, wherein each of said auxiliary electrodes has two auxiliary electrode elements disposed on both sides of said corresponding wire electrode block opposed thereto, and wherein, when said driving circuit drives both the auxiliary electrode elements of said selected auxiliary electrode and the selected wire electrode of said wire electrode block, discharge is made therebetween to record an electrostatic latent image on said electrostatic recording medium.

8. An electrostatic recording apparatus according to claim 7, wherein said drive signal control means controls the pulse width of at least the drive signal applied to said auxiliary electrodes of those applied to said auxiliary electrode and said wire electrodes, in accordance with the output signal from said humidity detector.

9. An electrostatic recording apparatus according to claim 7, wherein said drive signal control means controls an absolute value of at least the drive signal applied to said auxiliary electrodes of the drive signals applied to said auxiliary electrode and said wire electrodes, in accordance with the output signal from said humidity detector.

* * * * *